(12) United States Patent
Li

(10) Patent No.: US 6,899,212 B2
(45) Date of Patent: May 31, 2005

(54) DEVICE FOR HOLDING A WHEEL AGAINST ROTATION ON AN INCLINED SURFACE

(76) Inventor: Tianfu Li, 1103 Winthrop Dr., Troy, MI (US) 48083

( * ) Notice: Subject to any disclaimer, the term of this patent is extended or adjusted under 35 U.S.C. 154(b) by 0 days.

(21) Appl. No.: 10/212,549

(22) Filed: Aug. 6, 2002

(65) Prior Publication Data

US 2004/0026209 A1 Feb. 12, 2004

(51) Int. Cl.$^7$ ................................................. B60T 7/12
(52) U.S. Cl. ....................... 192/219.3; 192/44; 188/177
(58) Field of Search ........................... 192/219.1, 219.3, 192/44, 45; 188/30, 31, 82.1, 139, 2 F, 17, 26, 177, 82, 84, 114

(56) References Cited

U.S. PATENT DOCUMENTS

| | | | |
|---|---|---|---|
| 603,015 A | * | 4/1898 | Rolph .......................... 188/139 |
| 959,279 A | * | 5/1910 | Joseph et al. ................ 188/177 |
| 3,623,575 A | * | 11/1971 | Joseph et al. .................. 188/31 |
| 4,629,036 A | * | 12/1986 | Choy .......................... 188/1.12 |
| 4,650,046 A | | 3/1987 | Parsons |
| 4,867,291 A | | 9/1989 | Holman et al. |
| 5,474,164 A | | 12/1995 | Berger |
| 5,845,746 A | * | 12/1998 | Henrickson et al. ........ 188/2 F |
| 6,138,804 A | | 10/2000 | Tazumi et al. |
| 6,186,298 B1 | | 2/2001 | Wake |
| 6,206,164 B1 | | 3/2001 | Kurita |
| 6,374,954 B1 | * | 4/2002 | Cheng ........................ 188/1.12 |

* cited by examiner

Primary Examiner—Saul Rodriguez
(74) Attorney, Agent, or Firm—Frank G. McKenzie

(57) ABSTRACT

A one-way clutch includes a chamber containing a roller that moves in response to changes in the angular position of a component relative to an axis, such as in response to the slope of a surface on which a wheel is supported, to engage and disengage alternately a one-way drive connection between a non-rotating component and a component that rotates with the wheel. The wheel is prevented from rolling backward on an inclined surface due to this engagement and is free to ascend the inclined surface due to the disengagement.

16 Claims, 7 Drawing Sheets

DEVICE FOR HOLDING A WHEEL AGAINST ROTATION ON AN INCLINED SURFACE

BACKGROUND OF THE INVENTION

1. Field of the Invention

This invention relates to the field of vehicle hill holder devices, in particular to a hill holder that includes a one-way clutch.

2. Description of the Prior Art

Various types of hill holders have been proposed to prevent a vehicle or any wheeled device from rolling backward down an incline. For example, U.S. Pat. No. 4,867,291 describes use of a hill holder in combination with a manual transmission for a motor vehicle. The hill holder includes a releasable one-way clutch that permits a shaft of the transmission to turn in one direction when the transmission is disposed for operation in forward drive and in an opposite direction when the transmission is set to operate in reverse drive. The actuation system selectively engages and releases the clutch depending on the position of a gearshift lever.

Similarly U.S. Pat. No. 4,650,046 describes a hill holder in combination with a transmission gearbox. The hill holder prevents reverse movement of a motor vehicle through operation of a sprag clutch and a conventional hydraulically actuated disc brake. U.S. Pat. No. 5,474,164 describes a hill-hold mechanism that includes a one-way clutch coupled to a transmission input shaft, a toggle link having a friction pad coupled to the transmission output shaft, and a friction band coupled to the one-way clutch for locking the clutch when the toggle link and friction path react to a change in rotation of the output shaft. The mechanism prevents a vehicle from rolling down an incline, but it permits the vehicle to be driven away in the forward drive direction.

Various one-way clutches have been proposed to produce a one-way drive connection between an outer race and inner race. For example, U.S. Pat. No. 6,138,804 describes a one-way clutch having rollers located in pockets between an outer race and inner race, and coiled compression springs located in each pocket for urging the rollers to a side of the pocket where the outer race and inner race are driveably connected.

U.S. Pat. No. 6,206,164 describes a dual-mode, two-way clutch having V-shaped cam faces formed on an inner race and a circumferentially extending raceway formed in the outer race. Roller elements located between the cam faces and race way drivable connect the inner and outer races when the rollers are held on the cam face. Radial gaps are formed between the rollers and the outer race. The rollers are retained within pockets formed in a retainer, which includes projections that engage within grooves formed on the inner race. When the retainer is urged toward the inter race by the application of an external force, the projections engage the groove to lock the retainer to the inner race. The rollers are located between the cam faces.

The one-way clutch described in U.S. Pat. No. 6,186,298 includes an outer race having a cam surface, an inner race formed with a track surface facing the cam surface, rollers located between the outer race and inner race, springs biasing the rollers in one circumferential direction, a side plate for holding the rollers and the spring at predetermined intervals along the circumferential direction, and a control member acting on the rollers to lock up the one-way clutch in both directions or one only direction by urging the rollers radially against the outer surface of the inner race or the inner surface of the outer race. This frictionally engages the races or releases the rollers from engagement with the races.

SUMMARY OF THE INVENTION

The hill holder for holding a wheel against rotation on an inclined surface according to the present invention includes a first component supported for rotation about a first axis and having a first surface; a second component supported for angular displacement relative to a horizontal plane, having a second surface inclined at an acute angle with respect to the first surface and forming a space therebetween; and a roller located and displaceable in said space, the roller producing a one-way drive connection between the first surface and second surface in response to angular displacement of the second component relative to the horizontal plane.

DESCRIPTION OF THE PREFERRED EMBODIMENT

Figure 1:
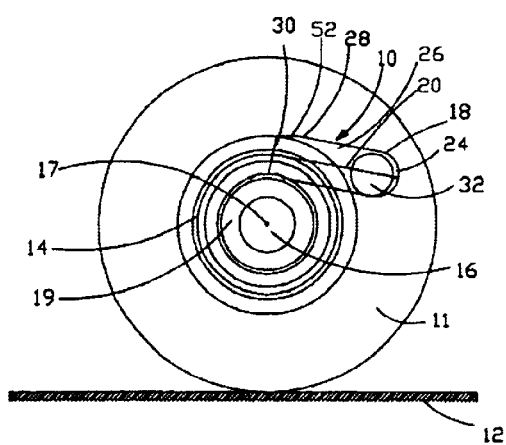
FIG. 1 is a side view showing a wheel assembly, axle shaft and one-way clutch according to the present invention.

FIG. 1 is a side view showing a wheel 11 supported on a horizontal surface 12, the wheel being mounted on a wheel hub or disc 14, which is supported on an axle shaft 16 for rotation about the central longitudinal axis 17 of shaft 16. The axle shaft 16 is fixed to, or otherwise supported on a non-rotating vehicle component 19, such as the chassis or suspension system of a vehicle or another wheeled conveyance, e.g., a bicycle, scooter, wheelchair, shopping cart or a walker used to support and stabilize a disabled person while standing or walking.

A one-way clutch 10 includes a chamber 18 formed on the vehicle component 19, the chamber having a centerline 20 whose projection in the side views of the drawing appears as a chord of the circle having its center at axis 17. The chamber 18 includes several passage segments that define a path along which a roller 32, located in chamber 18, moves. A first end segment 24 has a substantially spherical closed end surface for limiting movement of the roller. A second segment 26, communicating with the interior end of segment 24, has a cross section that increase steadily from the inner end of passage 24 as the distance along line 20 increases. A third passage segment 28, located adjacent the inner end of passage 26, has an interior surface in the form of a truncated right circular cone, whose diameter decreases linearly as the distance along chordal centerline 20 increases from the inner end of passage 26. A fourth passage segment 30, located adjacent the inner end of passage segment 28, has an inner surface in the form of a right circular cylinder.

Figure 2:
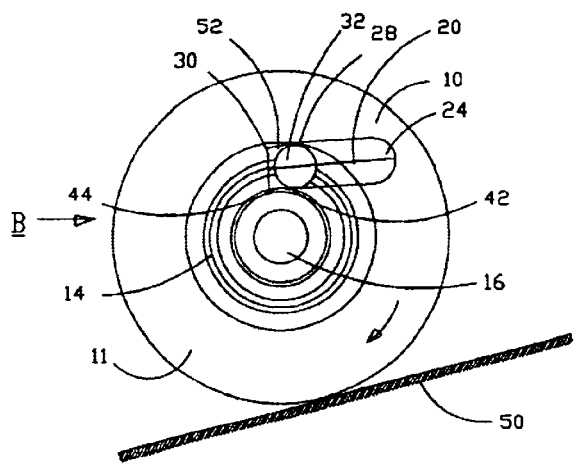
FIG. 2 is a side view similar to that of FIG. 1 showing the wheel ascending an inclined surface.

Located within the passages of chamber 18 is a spherical roller 32, sized to fit within, and to move readily along chamber 18 in response to changes in the direction and magnitude of the slope of the surface on which wheel 11 is supported. The angular disposition of component 19 with respect to axis 17 changes as the slope of surface 12 changes. For example, as seen in FIG. 2, when the wheel 11 is supported on an inclined surface 50 having a upward positive slope, component 19 and clutch 10, which is formed on component 19, rotate counterclockwise about the horizontal plane. Similarly, when wheel 11 is supported on a surface that is inclined upward to the left, component 19 and clutch 10 rotate clockwise with respect to the horizontal plane.

The diameter of passage 30 is smaller than the maximum diameter of roller 32 so that the roller is prevented from entering passage 30 from passage 28, but the roller can extend partially into passage 30 and become stopped at 52, the throat of chamber 18 located at the interface between passage segments 28 and 30. Similarly the closed end 24 prevents movement of the roller out of the chamber 18.

Figure 5:
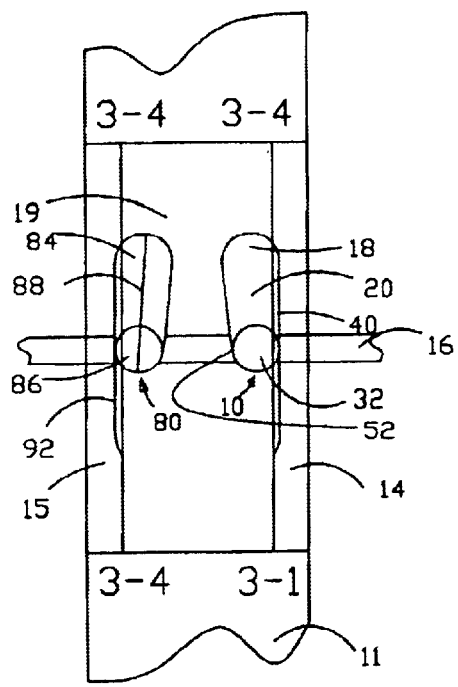
FIG. 5 is a top view of the wheel assembly of FIG. 1 showing two discs and two one-way clutches according to the invention.

FIG. 5 is a top view of FIG. 1 showing chamber 18 located adjacent a surface 40 of disc 14. The lateral side of chamber 18 that faces disc 14 is open to the disc so that roller 32 driveably engages surface 40 and the opposite lateral surface 42 of chamber 18 when roller 32 is located at the throat 52 of the chamber, as shown in FIG. 5.

FIG. 2 shows the wheel 11 supported on and ascending inclined surface 50. Centerline 20 has rotated counterclockwise about the horizontal plane from the upwardly inclined direction of FIG. 1 to the downwardly inclined position of FIG. 2. This rotation of component 19 the horizontal plane causes roller 32 to move from its location at the end of passage 24 to the throat 52, where roller 32 is prepared to produce a one-way drive connection between vehicle component 19 and disc 14, on which wheel 11 is mounted. One-way clutch 10 permits wheel 11 and disc 14 to rotate clockwise as the vehicle ascends incline 50 because clockwise rotation of the disc forces roller 32 out of driving engagement with the disc and component 19. However, when the wheel stops on surface 50, the roller 32 reengages the disc and component due to even slight counterclockwise rotation of wheel 11, thereby preventing the wheel from rolling down surface 50. Any tendency for the wheel to rotate counterclockwise holds the roller driveably engaged with disc 14 and component 19.

Figure 3:
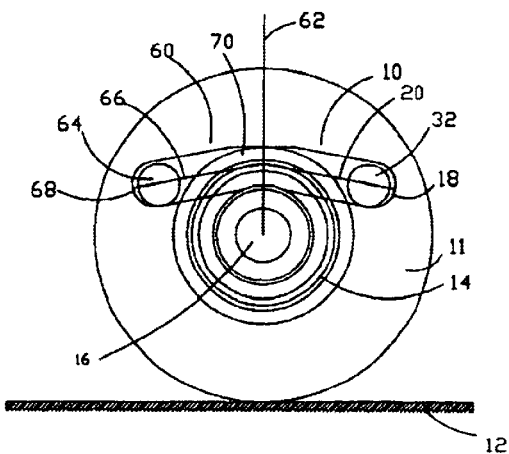
FIGS. 3 and 4 are side views of an axle shaft, wheel, and one-way clutches according to the present invention located on a flat surface and inclined surface, respectively.

FIG. 3 shows an arrangement similar to that of FIG. 1 except that a second one-way clutch 60 is located on the opposite side of the vertical axis 62 from the location of clutch 10. The form of clutch 60 is essentially identical to that of clutch 10 and includes passage segments formed in vehicle component 19, along which passage segments a roller 64 moves in response to the changing inclination of the longitudinal axis 66 of clutch 60 about the horizontal plane. Roller 64 moves between the closed end at the left-hand extremity of chamber 68, where its movement is blocked, and the constricted throat 70, where the roller produces a one-way drive connection between disc 14 and component 19.

Figure 4:
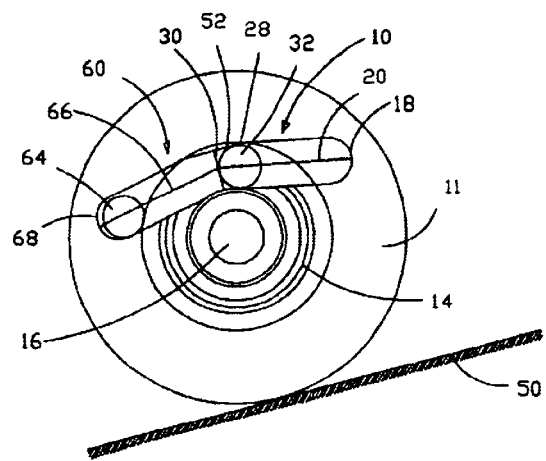

FIG. 4 shows the reaction of one-way clutches 10, 60 to movement of wheel 11 upward along the inclined surface 50. Roller 32 moves rightward along axis 20 within chamber 18 toward the throat 52 or restricted portion of chamber 18, located between passage segments 28 and 30. However roller 32 will not become driveably engaged between disc 14 and component 19 due to the clockwise rotation of the wheel, which tends to move the roller away from the engaged position. Roller 64 moves along axis 66 to the closed end of chamber 68. In this position roller 64 is entirely disengaged from the wheel and disc 14. The wheel move up surface 50 and can be stopped in any location along the inclined surface 50. Any tendency of the wheel to roll counterclockwise down surface 50 will maintain roller 32 driveably engaged between disc 14 and chamber 18 of vehicle component 19, thereby preventing the wheel from rolling down the incline. However, when the wheel continues upward on surface 50, roller 32 becomes disengaged due to clockwise rotation of the wheel relative to disc 14 and chamber 18.

Similarly, if the slope of inclined surface 50 is negative, i.e. upward to the left, roller 64 moves toward throat 70, and roller 32 moves to the closed end of chamber 18. There, roller 64 will permit movement of the wheel up the incline and will prevent the wheel from rolling down the incline due to engagement of roller 64 with disc 14 and component 19.

FIG. 5 is a top view of FIG. 1 in which a first disc 14 is located on one axial outer side of one-way clutch 10, and a second disc 15, substantially identical to disc 14, is located at the opposite axial side from the location of disc 14 and adjacent a second one-way clutch 80. Wheel 11 is mounted on discs 14, 15, and that wheel-disc assembly is supported rotably on axle shaft 16, which is supported on a non-rotating vehicle component 19.

Clutch 80 includes a chamber 84, similar to chamber 18, and contains a roller 86 whose position along the central axis 88 of chamber 84 is determined by the slope of the inclined surface 50 on which the wheel is supported. As the wheel ascends surface 50, roller 86 moves toward the throat of chamber 84, in preparation to produce a drive connection between disc 15 and component 19. That drive connection is prevented as wheel 11 moves upward on inclined surface 50. FIG. 5 shows that the inner and outer surfaces of discs 14 and 15 are formed with clutch engageable surfaces 40, 92, respectively, with which the rollers 32, 86 produce a one-way drive connection with component 19.

Figure 6:
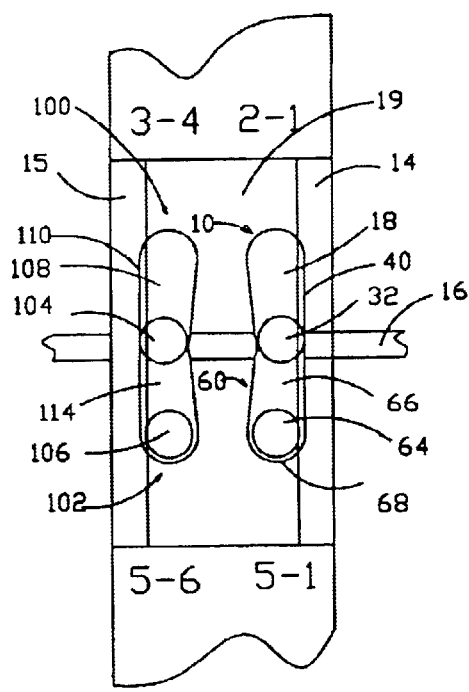
FIG. 6 is a top view of the wheel assembly of FIG. 3 showing two pairs of one-way clutches.

FIG. 6 is a top view of FIG. 3 showing a first pair of one-way clutches 10, 60 located at one axial side of shaft 16 adjacent disc 14, and a second pair of one-way clutches 100, 102 located at the opposite axial side of shaft 16 adjacent disc 15. Clutch 10 contains roller 32; clutch 60 contains roller 64; clutch 100 contains roller 104; and clutch 102 contains roller 106.

FIG. 6 shows roller 104 having moved within the chamber 108 of clutch 100 to the throat of the clutch, where a one-way drive connection is possible between the clutch engagement surface 110 on disc 15 and component 19. Similarly roller 32 has moved within chamber 18 of clutch 10 to produce a one-way drive connection between clutch engagement surface 40 on disc 14 and the surface of component 19 at the throat of clutch 10. Rollers 68 and 106 have moved within chambers 66 and 114 to the closed end of clutches 60 and 102 away from surfaces their corresponding clutch engagement surfaces 40, 110 so that they produce no drive connection with component 19. A side view of the position of the rollers is shown in FIG. 4.

Figure 7:
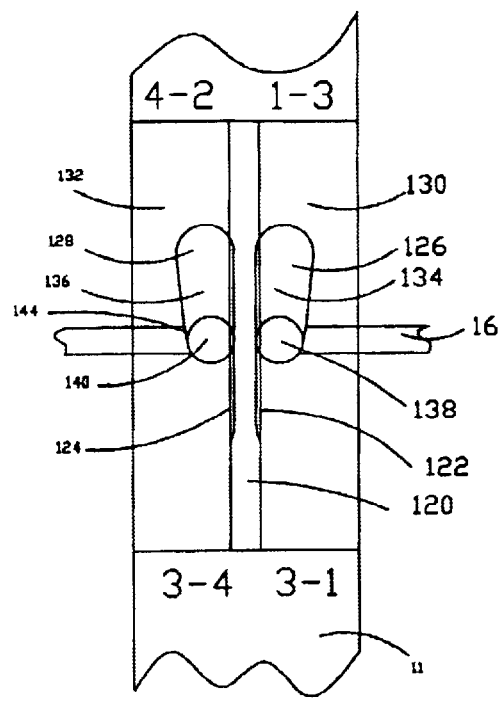
FIG. 7 is a top view of a wheel assembly showing a central disc adapted for engagement by two one-way clutches according to this invention.

FIG. 7 is a top view of another arrangement in which a single clutch disc 120, formed with clutch engagement surfaces 122, 124, each located on an opposite axial side of the discs, is located between two one-way clutches 126, 128, which are formed on vehicle non-rotating vehicle components 130 and 132. Wheel 11, removeably fixed to disc 120, is rotatably supported on axle shaft 16, which is supported on components 130, 132. Side views of the arrangement of FIG. 7 are substantially identical to FIGS. 1 and 2. When the wheel 11 ascends inclined surface 50, rollers 138, 140 move within the chambers 134 and 136 of clutches 126, 128, respectively, toward the throat of the corresponding clutches, for potential engagement with clutch engagement surfaces 120 and 124 and the interior surfaces of the corresponding clutches 126, 128 formed on components 130, 132. In this way, wheel 11 can be stopped at any position on surface 50, preventing the wheel from rolling down the incline surface. However, clockwise rotation of wheel 11 while located on inclined surface 50 causes rollers 138 and 140 to disengage the one-way drive connection between disc 120 and components 130, 132, thereby permitting the wheel 11 to move up inclined surface 50.

Figure 8:
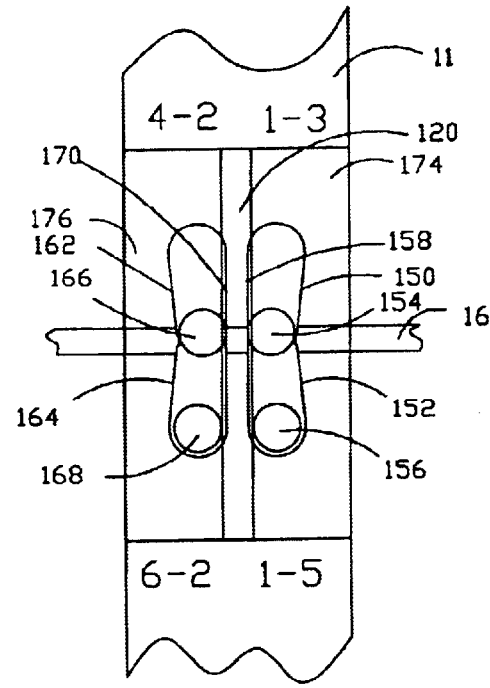
FIG. 8 is a top view a wheel assembly showing a central disc located between two pairs of one-way clutches.

FIG. 8 is a top view of an arrangement in which two pairs of one-way clutches, according to the present invention, are located on opposite axial sides of a centrally located disc 120. Wheel 11 is removably fixed to the disc 120. The first clutch pair includes clutches 150 and 152, each clutch containing a roller 154, 156. The face of disc 120 adjacent clutches 150 and 152 is formed with a clutch engagement surface 158 adapted to be driveably engaged with vehicle component 174 alternately by rollers 154, 156 depending on the upward or downward inclination of the surface on which wheel 11 is traveling.

Similarly a second clutch pair comprising one-way clutches 162 and 164, each containing a roller 166, 168 adapted to travel along the chamber of the corresponding clutch into and out of drivable engagement with a clutch engagement surface 170 formed on the adjacent lateral face of disc 120.

When wheel 11 is ascending an inclined surface 50, rollers 166 and 154 move to the position shown in FIG. 8 where they potentially produce a one-way drive connection between disc 120 and vehicle components 174, 176 depending on the direction of rotation of wheel 11. The drive connection results when the rollers 154, 164 driveably engage the engagement surfaces 150, 162 and components 174, 176. When this engagement occurs, rollers 156, 168 move to the closed end of the chambers of clutches 152, 164, out of engagement with disc 120. However, when wheel 11 ascends an inclined surface having a negative slope compared to the slope of FIG. 4, the rollers 156, 168 within clutches 152, 164 move along the axis of the corresponding clutches to potentially produce a one-way drive connection between disc 120 and vehicle components 174, 176. In this instance, rollers 154 and 166 move away from the engagement surfaces 150, 162 to the closed end of their corresponding clutch chambers, out of engagement with disc 120 and components 174, 176.

Figure 9:
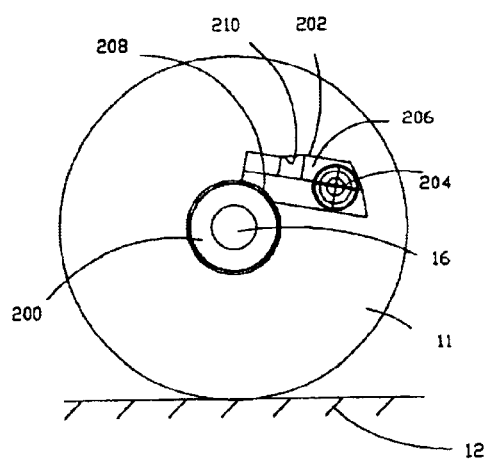
FIG. 9 is a side view showing a one-way clutch according to this invention located to engage a rotating component.
Figure 10:
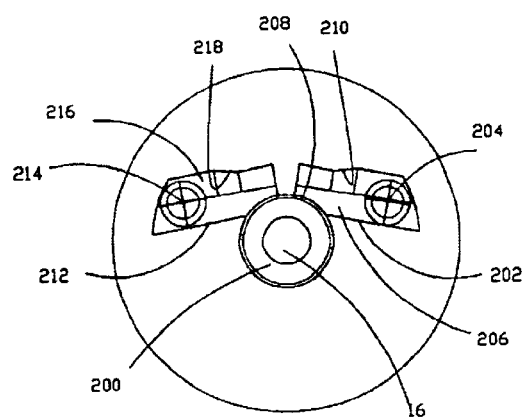
FIG. 10 is a side view showing two one-way clutches according to this invention located to engage a rotating component.

FIGS. 9 and 10 show side views of an assembly that includes a wheel hub 200, a wheel 11 mounted on the hub, and an axle shaft 16, supported on the structure of a vehicle. A one-way clutch 202, formed on the structure of the vehicle or other conveyance, contains a roller 204 that moves along the chamber 206 of the clutch 202 into and out of a one-way drive engagement with wheel hub 200 and the vehicle structure. FIG. 9 shows roller 204 located out of engagement with the wheel hub 200. However, when the wheel moves along an inclined surface having a positive slope when viewed as in FIG. 9, roller 204 moves into engagement with the hub 200, prepared to produce a drive connection between the outer surface of the wheel hub 200 and the vehicle structure at the inner surface 210 of clutch 202. With the roller 204 engaged with the wheel hub 200 and the inner surface 210, the wheel is held against rotation down the upwardly inclined surface. However, when wheel 11 turns clockwise and rolls upward on the incline, its rotation forces roller 204 away from the one-way drive connection, thereby allowing the wheel to advance upward along the inclined surface.

FIG. 10 shows a pair of directional opposed one-way clutches 202, 212, according to the present invention, the clutches being adapted to produce a drive connection between the outer surface 208 of wheel hub 200 and a non-rotating portion of the vehicle structure, on which clutch 202 and clutch 212 are formed. Clutch 212 contains a roller 214 adapted to move in the chamber 216 into and out of one-way drive engagement with the wheel hub 200. In the position shown in FIG. 10, roller 214 is disengaged from the wheel hub. However, if the wheel were located on an inclined surface whose slope is negative when viewed as in FIG. 10, then roller 214 moves to the right-hand end of chamber 216, where it contacts surface 218 and the hub, prepared positionally to driveably engage the wheel hub 200 and surface 218, formed on the inner surface of the one-way clutch 212. When roller 214 is driveably connected with hub 200 and surface 218, roller 204 will have moved along axis 206 to the position shown in FIG. 10. Clutch 212 will prevent wheel 11 from turning counterclockwise and the vehicle from rolling down the incline. The configuration of FIG. 10, therefore, provides two one-way drive connections to prevent the wheel from rolling down either a positively or negatively inclined surface when the wheel is stopped on such surfaces.

Figure 11:
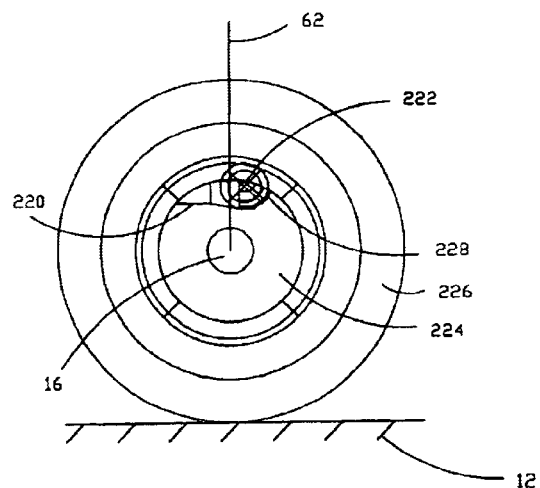
FIG. 11 is a side view of a wheel assembly and a one-way clutch according to the present invention.
Figure 12:
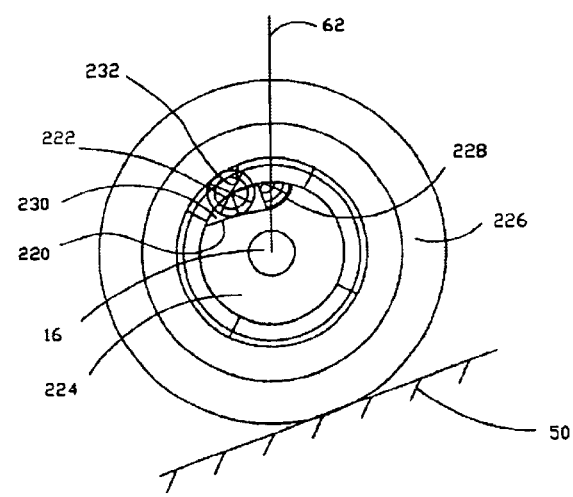
FIG. 12 is a side view similar to that of FIG. 11 showing the assembly located on an inclined surface, the one-way clutch positioned for engagement.

FIGS. 11 and 12 show another arrangement of a one-way clutch 220 containing a roller 222 adapted to move within the clutch cylinder across central axis 62 into and out of a one-way drive engagement with a wheel hub 224, on which a wheel 226 is mounted for rotation about axle shaft 16. When the wheel is located on a substantially horizontal surface 12, roller 222 is located at an interior, closed end 228 of the clutch chamber that contains the roller. In that position, the roller is driveably disengaged and the wheel is free to turn relative to shaft 16. However, when the wheel is located on an inclined surface 50, whose slope is positive as viewed in FIG. 12, roller 222 moves leftward within the chamber until the roller becomes driveably engaged between surface 230, formed on the wheel hub 224, and surface 232, which is formed on a non-rotating component, e.g., the structure of the vehicle. With the clutch disposed as shown in FIG. 12, roller 222 produces a one-way drive connection between surfaces 230 and 232, thereby preventing the wheel from rolling counterclockwise down inclined surface 50. However, the wheel can rotate clockwise up surface 50 because clockwise rotation of the wheel urges roller 222 out of engagement with surface 232 permitting the wheel to rotate freely.

Figure 13:
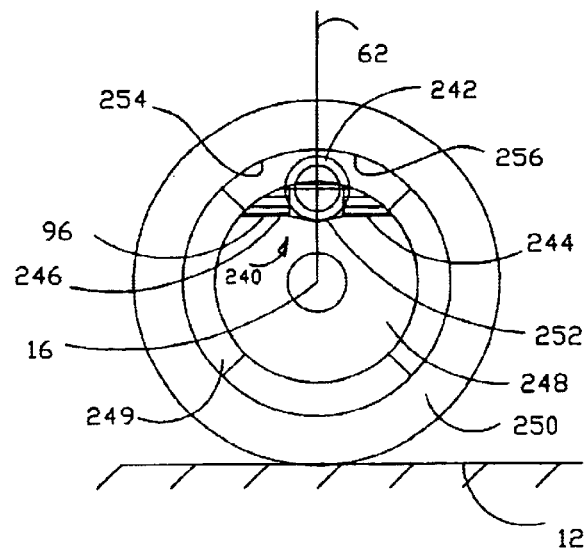
FIG. 13 is a side view of a wheel assembly having a one-way clutch adapted for engagement depending on the inclination of the road surface.

FIG. 13 shows a one-way clutch 240 having a roller 242 located in a recess 252 located between surfaces 244, 246, formed on a component 248, such as the chassis of a vehicle or other conveyance. A wheel hub 249, to which the wheel 250 is fixed for rotation, is supported on axle shaft 16. When wheel 250 is supported on a substantially horizontal surface 12, roller 242 is located on the recess 252 substantially aligned with the vertical axis 62 of the assembly.

When the wheel is located on an inclined surface having a positive slope, the vehicle component 248 rotates counterclockwise about the horizontal plane, and roller 242 moves leftward from the recess to surfaces 246 and 254, where the roller is poised produce a one-way drive engagement between surface 246 and surface 254, which is formed on the hub 249. The roller driveably engages surfaces 246 and 254 in response to any counterclockwise rotation of the wheel down the inclined surface, thereby holding the wheel in position on the surface and preventing the wheel from rolling backward. However, the roller disengages surfaces 246 and 254 when the wheel rotates clockwise and moves up the incline.

When the wheel assembly is located on a surface inclined with a negative slope, the vehicle component 248 rotates clockwise about the horizontal plane, and roller 242 moves rightward from the recess across axis 62 to surfaces 244 and 256, where the roller is poised to produce a one-way drive engagement between surface 244 and surface 256, which is formed on the hub 249. The roller driveably engages surfaces 244 and 256 in response to any clockwise rotation of the wheel down the inclined surface, thereby holding the wheel in position on the surface and preventing the wheel from rolling backward. However, the roller disengages surfaces 244 and 256 when the wheel rotates counterclockwise and moves up the incline.

Figure 14:
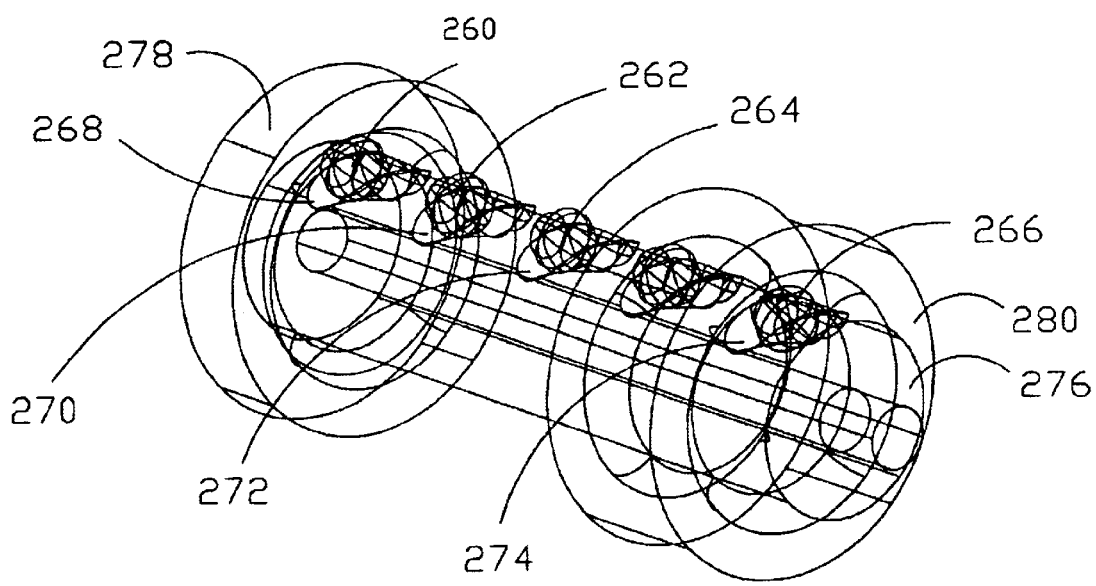
FIG. 14 is an isometric view of an axle shaft showing multiple one-way clutches spaced along a shaft, each clutch adapted to engage a disc.

FIG. 14 is an isometric view showing an alternate arrangement of the invention, in which several rollers 260, 262, 264, 266 move within tracks 270–274, formed on the outer surface of a shaft 276. When a wheel mounted on the outer surface of the discs is located on an inclined surface having a positive slope, the rollers 262–266 move in the tracks leftward to the inner surface of discs 278, 280 located at the axial position of each roller. The rollers driveably engage the discs in response to counterclockwise rotation of the wheel and discs. This engagement prevents the wheel from rolling counterclockwise down the incline. The rollers disengage the discs in response to clockwise rotation, thereby permitting the wheel to roll up the incline.

When the wheel is located on an inclined surface having a negative slope, the rollers 262–266 move in the tracks rightward to the inner surface of discs 278, 280. The rollers driveably engage the discs in response to clockwise rotation of the wheel and discs. This engagement prevents the wheel from rolling clockwise down the incline. The rollers disengage the discs in response to counterclockwise rotation, thereby permitting the wheel to roll up the incline.

Figure 16:
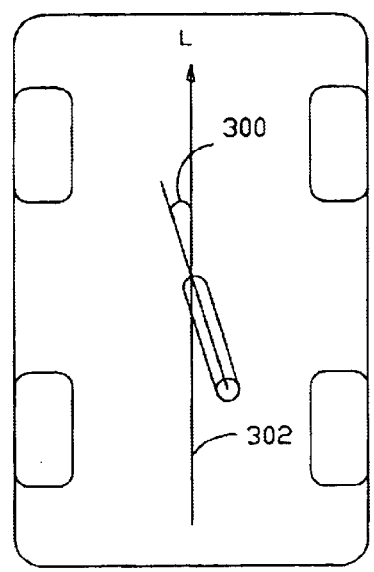
FIG. 16 is a top view of a motor vehicle showing the angle between the longitudinal axis of a motor vehicle or other conveyance and a projection of the centerline of a chamber of a clutch according to this invention.

Each roller travels within its clutch chamber toward the position where the roller produces a drive connection along a path that is inclined at an angle 300 with respect to the longitudinal axis 302, as FIG. 16 shows. This angular inclination 300 facilitates engagement of the roller with the surfaces of the clutch and the rotating member or disc.

Figure 15:
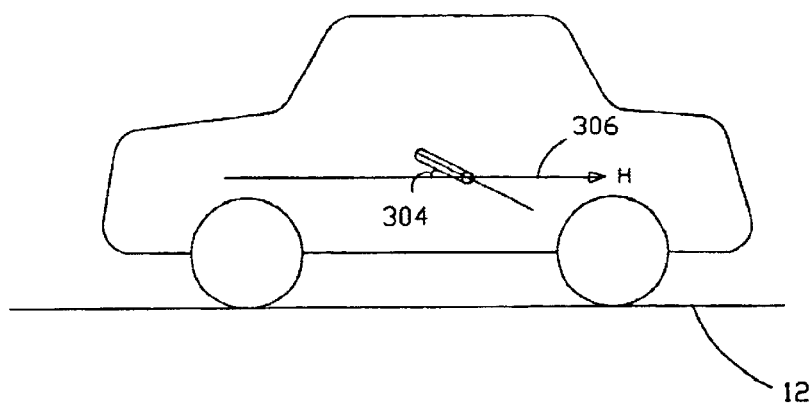
FIG. 15 is a side view of a motor vehicle showing the angle between the horizontal plane and a projection of the centerline of a chamber of a clutch according to this invention.

Similarly, each roller travels within its clutch chamber toward the position where the roller produces a drive connection along a path that is initially inclined at an angle 304 with respect to the horizontal plane 306 when the wheel is supported on a horizontal surface 12, as FIG. 15 shows. The magnitude of angle 304 can be predetermined either by suitably forming the angle 304 when the clutch is formed or by adjusting the magnitude of angle 304 by mechanical or electronic techniques. In either case, the size of angle 304 affects the angle of the inclined surface 50, on which the wheel is supported, that will cause the clutch to engage and hold the wheel against travel on the surface 50. For example, when angle 304 is relatively small, the clutch will engage and prevent the wheel from rolling backward provided the slope of the inclined surface is relatively small. When angle 304 is relatively large, the clutch will engage and prevent the wheel from rolling backward, provided the slope of the inclined surface 50 is relatively large and sufficiently steep to cause the roller to move from the position of FIG. 1 to the position of FIG. 2.

Figure 17:
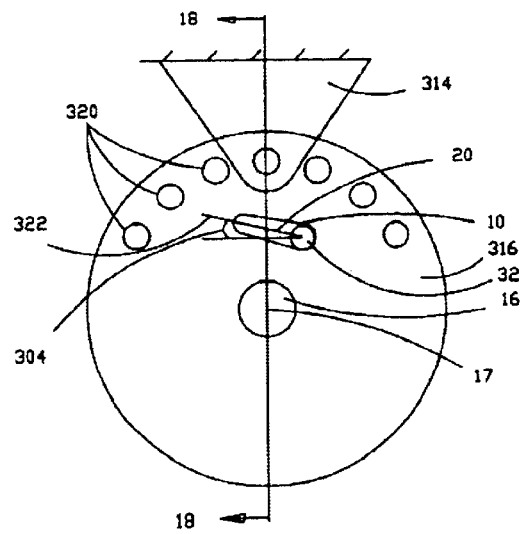
FIG. 17 is a side view of the arrangement of FIG. 18.
Figure 18:
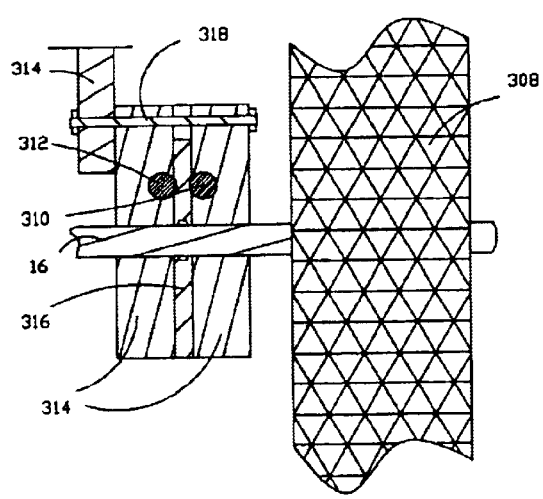
FIG. 18 is a cross section taken at plane 18—18 of FIG. 17.

FIGS. 17 and 18 show a wheel 308 supported on an axle shaft 16, the rollers 310, 312 of two clutches formed on a component 314 of the vehicle, a disc 316 engaged by the rollers and driveably connected to the shaft 16, and a pin or bolt 318 supported on component 314. The disc 316 is formed with angularly spaced holes 320, engageable by the bolt 318. The angle 304 between the axis 322 of the chamber and the horizontal plane can be adjusted by rotating the disc 316 about axis 17 and inserting the bolt 318 through a hole 320 and a hole 322 formed in component 314. In this way, the angular orientation of the chamber can be changed and adjustably fixed as required, to a predetermined angle at which the clutch roller will produce a one-way drive engagement, provided the slope of the inclined surface 50, on which the vehicle wheel is supported, is sufficiently steep to cause the rollers 310, 312 to engage the disc 316 and component 314.

Figure 19:
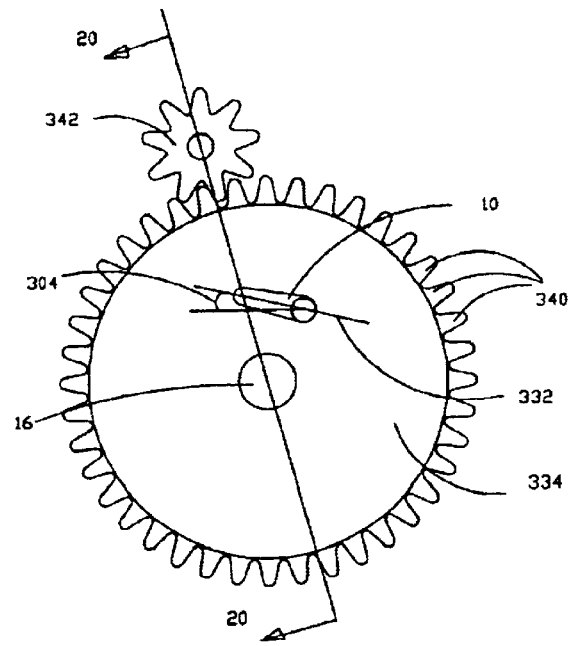
FIG. 19 is a side view of the arrangement of FIG. 20.
Figure 20:
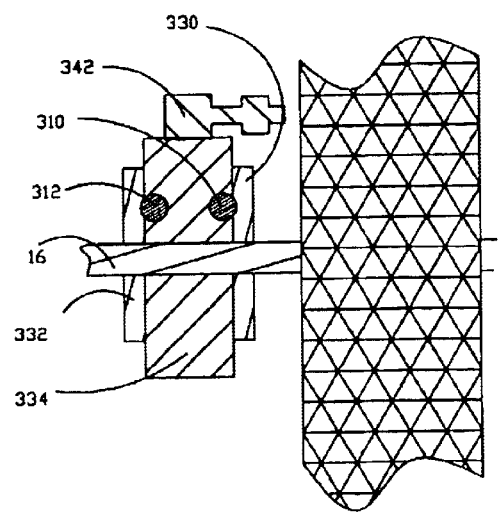
FIG. 20 is a cross section taken at plane 20—20 of FIG. 19.

FIGS. 19 and 20 show discs 330, 332 supported on a rotating axle shaft 16 and engaged by rollers, the rollers 310, 312 of two clutches 10 formed on a component 334 of the vehicle, the vehicle component 334 being formed with teeth 340 distributed around the circumference of the component. An electric motor carries a pinion 342, which is continually engaged with the teeth 340 of the component 334. The angle 304 between the axis 322 of the chamber 10 and the horizontal plane can be adjusted by rotating the pinion 342, which drives the component 334 for rotation about the axis of shaft 16. In this way, the angular orientation of the chamber 10 can be changed and adjustably fixed as required, to a predetermined angle 304 at which the clutch rollers will produce a one-way drive engagement, provided the slope of the inclined surface 50, on which the vehicle wheel is supported, is sufficiently steep to cause the rollers 310, 312 to engage the discs 330, 332 and component 334.

Figure 21:
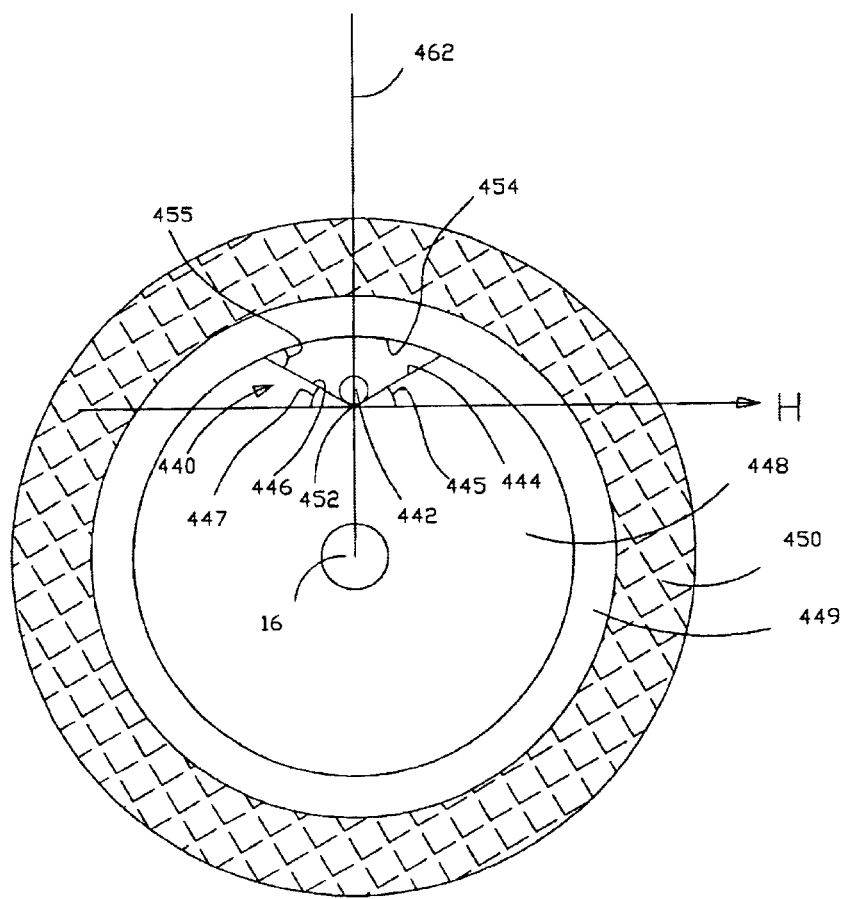
FIG. 21 is a side view of a wheel assembly having a clutch adapted for engagement depending on the direction and magnitude of the inclination of the road surface.

FIG. 21 shows a clutch 440 having a roller 442 located in a recess 452 located between surfaces 444, 446, formed on a non-rotating component 448, such as the chassis of a vehicle or other conveyance. A wheel hub 449, to which the wheel 450 is fixed for rotation, is supported on axle shaft 16. When wheel 450 is supported on a substantially horizontal surface, roller 442 is located in the recess 452 substantially aligned with the vertical axis 462 of the assembly. Surface 444 is inclined with respect to the horizontal plane at a predetermined angle 445; surface 446 is inclined with respect to the horizontal plane at a predetermined angle 447 whose magnitude can be different than that of angle 445. The inclinations or slopes of the angles are in opposite directions.

When the wheel is located on an inclined surface having a positive slope of sufficient magnitude, the vehicle component 448 rotates counterclockwise about shaft 16, and roller 442 moves leftward from the recess along surface 446 into contact with the wheel hub surface 454, where the roller is poised to produce a one-way drive engagement between surface 446 and surface 454. Preferably the angle 455 between surface 446 or surface 444 and a tangent to surface 454, where roller 442 contacts surface 454, is an acute angle. The roller 442 driveably engages surfaces 446 and 454 in response to sufficient counterclockwise rotation of component 448, thereby holding the wheel in position on the surface and preventing the wheel from rolling backward. However, the roller disengages surfaces 446 and 454 when the wheel is supported on a surface whose slope is less than the magnitude of angle 447.

Throughout this description and the claims, the term "roller" comprehends a spherical roller, circular cylinder, cone, ellipsoid or another such form capable of rolling into and out of engagement with the clutch surfaces in response to angular displacement of the vehicle component about the horizontal plane due to changes in the slope and direction of inclination of the surface on which the wheel or vehicle is supported.

When the wheel assembly is located on a surface inclined with a slope opposite to the slope that causes the clutch to engage surfaces 454 and 446, the vehicle component 448 rotates clockwise about shaft 16, and roller 442 moves rightward from the recess 452 along surface 444 to surface 454, where the roller is poised to produce a one-way drive engagement between surface 444 and surface 454, which is formed on the hub 449. The roller driveably engages surfaces 444 and 454 in response to clockwise rotation sufficient to move the roller outward along surface 444, thereby holding the wheel in position on the inclined surface and preventing the wheel from rolling backward. However, the roller disengages surfaces 444 and 456 when the vehicle component 448 rotates counterclockwise sufficiently to cause the roller to move away from surface 454 on surface 444.

The rollers and rollers of the one-way clutches can be actuated hydraulically or pneumatically by supplying pressurized fluid to the clutch chamber alternately on opposite the sides of the rollers and rollers so that engagement and disengagement of the clutch results. The rollers and rollers can be actuated mechanically to engage and disengage the clutch alternately. The clutch can be engaged and disengaged also by changing the angular disposition of the vehicle component on which the rollers and rollers are supported relative to the axis about which the wheel rotates regardless of the angular inclination of the surface on which the wheel is supported.

In the arrangements described here, it can be seen that the roller or roller that produces the one-way drive connection moves within a clutch in several ways. The rollers or rollers of the one-way clutch move in response to the slope on the inclined surface laterally leftward and rightward, either from a disengaged position that is laterally spaced from a central axis toward an engaged position located radially near a central axis, or from a disengaged position located near a central axis toward an engaged position radially spaced from a central axis. The rollers or rollers of the one-way clutch can be arranged to move along the axis of a laterally directed shaft, such as an axle shaft, either axially outward to produce the drive engagement or axially inward to produce the drive engagement.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

I claim:

1. A device for holding a wheel against rotation on an inclined surface, comprising:

a first component supported for rotation about a first axis, having a first surface;

a second component supported for angular displacement relative to a horizontal plane, having a second surface facing the first surface and forming a space therebetween, the space having a length and a width that decreases along the length of the space; and a roller located and displaceable in said space, the roller driveably engaging the first and second surfaces across the width of the space, the roller producing a one-way drive connection between the first surface and second surface in response to angular displacement of the second component in a first direction relative to the horizontal plane.

2. The device of claim 1, wherein the second component comprises a chamber containing the roller, the chamber including the second surface, a closed end restricting displacement of the roller, and a path located in said space extending between the closed end and second surface, along which path the roller moves, the chamber having a lateral opening facing the first surface, the first surface and second surface being alternately mutually driveably engaged with the roller and disengaged from the roller in response to angular displacement of the second component in a first direction relative to the horizontal plane.

3. The device of claim 1, further comprising:

a third component supported for rotation about said first axis, and having a third surface; and a fourth surface formed on the second component, facing the third surface and forming a second space therebetween; and a second roller located and displaceable in said second space, the second roller producing a one-way drive connection between the third surface and fourth surface in response to angular displacement of the second component in a first direction relative to the horizontal plane.

4. The device of claim 3, wherein the second component comprises a second chamber containing the second roller, the second chamber including the fourth surface, a second closed end restricting displacement of the second roller, and a second path extending between the second closed end and fourth surface, along which second path the second roller moves, the second chamber having a lateral opening facing the third surface, the third surface and fourth surface being alternately mutually driveably engaged with the second roller and disengaged from the second roller in response to angular displacement of the second component in a first direction relative to the horizontal plane.

5. The device of claim 1, wherein the second component further comprises:
 a fifth surface facing the first surface and forming a third space therebetween; and
 a third roller located and displaceable in said third space, the third roller producing a one-way drive connection between the fifth surface and second surface in response to angular displacement of the second component relative to the horizontal plane in a second direction opposite to the first direction.

6. The device of claim 5, wherein the second component further comprises:
 a third chamber containing a third roller, the third chamber including the fifth surface, a third closed and restricting displacement of the third roller, and a third path extending between the third closed end and fifth surface, along which third path the third roller moves, the third chamber having a lateral opening facing the first surface, the first surface and fifth surface being alternately mutually driveably engaged with the third roller and disengaged from the third roller in response to angular displacement of the second component in a second direction opposite to the first direction relative to the horizontal plane.

7. The device of claim 1, wherein the second component further comprises:
 a sixth surface facing the third surface and forming a fourth space therebetween; and
 a fourth roller located and displaceable In said fourth space, the third roller producing a one-way drive connection between the sixth surface and third surface in response to angular displacement of the second component relative to the horizontal plane in a second direction opposite to the first direction.

8. The device of claim 7, wherein the second component further comprises:
 a fourth chamber containing a fourth roller, the third chamber including the sixth surface, a fourth closed end restricting displacement of the fourth roller, and a fourth path extending between the fourth closed end and sixth surface, along which fourth path the fourth roller moves, the fourth chamber having a lateral opening facing the third surface, the sixth surface and third surface being alternately mutually driveably engaged with the fourth roller and disengaged from the third roller in response to angular displacement of the second component in a second direction opposite to the first direction relative to the horizontal plane.

9. A device for holding a wheel against rotation on an inclined surface, comprising:
 a first component supported for rotation about a first axis, having a first surface, and a second surface located at an axially opposite side of the first component from the location of the first surface; and
 a second component supported for angular displacement relative to a horizontal plane, having a third surface spaced from the first surface, facing the first surface and inclined at an acute angle with respect to the first surface and forming a first space therebetween, the first space having a length and a width that decreases along the length of the first space; and
 a first roller located and displaceable in said first space, driveably engaging the first and second surfaces across the width of the first space, the first roller producing a one-way drive connection between the first surface and third surface in response to angular displacement in a first direction of the second component relative to the horizontal plane;
 a third component supported for angular displacement relative to the horizontal plane, having a fourth surface spaced from the second surface and facing the second surface, and forming a second space therebetween, the second space having a length and a width that decreases alone the length of the second space; and
 a second roller located and displaceable in said first space, driveably engaging the third and fourth surfaces across the width of the second space, the second roller producing a one-way drive connection between the fourth surface and second surface in response to angular displacement in a second direction of the third component relative to the horizontal plane.

10. The device of claim 9, wherein:
 the second component comprises a first chamber containing the first roller, the chamber including the third surface, a first closed end restricting displacement of the first roller, and a first path extending between the first closed end and second surface, along which first path the first roller moves, the first chamber having a lateral opening facing the first surface, the first surface and third surface being alternately mutually driveably engaged with the first roller and disengaged from the first roller in response to angular displacement of the second component relative to the horizontal plane; and
 the third component comprises a second chamber containing the second roller, the second chamber including the fourth surface, a second closed end restricting displacement of the second roller, and a second path extending between the second closed end and fourth surface, along which second path the second roller moves, the second chamber having a lateral opening facing the second surface, the second surface and fourth surface being alternately mutually driveably engaged with the second roller and disengaged from the second roller in response to angular displacement of the third component relative to the horizontal plane.

11. The device of claim 9, further comprising:
 a fifth surface formed on the second component, the fifth surface spaced from first surface, facing the first surface and forming a third space therebetween;
 a third roller located and displaceable in said third space, producing a one-way drive connection between the first surface and fifth surface in response to angular displacement in a second direction opposite the first direction of the second component relative to the horizontal plane;
 a sixth surface formed on the third component, the sixth surface spaced from the second surface, facing the second surface and forming a fourth space therebetween,
 a fourth roller located and displaceable in said fourth space, producing a one-way drive connection between the second surface and sixth surface in response to angular displacement in a second direction opposite the first direction of the second component relative to the horizontal plane.

12. The device of claim 11, wherein:

the second component comprises a third chamber containing the third roller, the third chamber including the fifth surface, a third closed end restricting displacement of the third roller, and a third path extending between the third closed end and fifth surface, along which third path the third roller moves, the third chamber having a lateral opening facing the first surface, the first surface and fifth surface being alternately mutually driveably engaged with the third roller and disengaged from the third roller in response to angular displacement of the second component relative to the horizontal plane; and the third component comprises a fourth chamber containing the fourth roller, the fourth chamber including the sixth surface, a fourth closed end restricting displacement of the fourth roller, and a fourth path extending between the fourth closed end and sixth surface, along which fourth path the fourth roller moves, the fourth chamber having a lateral opening facing the sixth surface, the second surface and sixth surface being alternately mutually driveably engaged with the fourth roller and disengaged from the fourth roller in response to angular displacement of the third component relative to the horizontal plane.

13. A device for holding a wheel supported on an inclined surface against rotation on the surface, such surface having a slope, comprising:

a first component supported for rotation about a first axis, and having a first engageable clutch surface;

a second component whose angular disposition relative to a horizontal plane changes in response to a change of said slope, having a second clutch surface spaced from the first clutch surface across a distance that decreases in magnitude alone a length of a space therebetween; and a one-way clutch for producing a one-way drive connection between the first component and second component in response to angular displacement of the second component relative to the horizontal plane, said clutch alternately driveably engaging said first and second engageable clutch surfaces across said distance and disengaging said first and second engageable clutch surfaces.

14. The device of claim 13, wherein the one-way clutch includes a roller supported for movement toward disengagement from the first and second clutch surfaces when the wheel is located on a surface inclined with respect to the horizontal plane at an angle that is equal to or less than a first predetermined angle, and movement toward engagement with the first and second clutch surfaces when the wheel is located on a surface inclined with respect to the horizontal plane at an angle greater than said first predetermined angle.

15. A device for holding a wheel supported on an inclined surface against rotation, such surface having a slope, comprising:

a first component supported for rotation about a first axis, and having a first clutch surface;

a second component whose angular disposition relative to a horizontal plane changes in response to a change of said slope, having a second clutch surface spaced from the first clutch surface across a distance that decreases in magnitude along a length of a space therebetween, and a third clutch surface spaced from the first clutch surface across a second distance that decreases in magnitude alone a length of a spaced therebetween; and a one-way clutch for producing a one-way drive connection between the first component and second component, said clutch driveably engaging said first and second clutch surfaces across said first distance and disengaging said first and third clutch surfaces in response to angular displacement in a first direction of the second component relative to the horizontal plane, and said clutch driveably engaging said first and third clutch surfaces across said second distance and disengaging said first and second clutch surfaces in response to angular displacement in a second direction opposite the first direction of the second component relative to the horizontal plane.

16. The device of claim 15, wherein the one-way clutch includes a roller supported for movement toward engagement with the first and second clutch surfaces when the wheel is located on a surface having a slope in a first angular direction with respect to the horizontal plane at an angle that is equal to or greater than a first predetermined angle, and toward engagement with the first and third clutch surfaces when the wheel is located on a surface having a slope in a second angular direction opposite the first angular direction with respect to the horizontal plane at an angle that is equal to or greater than a second predetermined angle.

* * * * *